United States Patent
Hiramatsu

(10) Patent No.: US 8,439,794 B2
(45) Date of Patent: May 14, 2013

(54) AUTOMATIC TRANSMISSION

(75) Inventor: Takeo Hiramatsu, Nagaokakyo (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/476,375

(22) Filed: May 21, 2012

(65) Prior Publication Data

US 2012/0277053 A1 Nov. 1, 2012

Related U.S. Application Data

(62) Division of application No. 12/271,115, filed on Nov. 14, 2008.

(30) Foreign Application Priority Data

Nov. 29, 2007 (JP) .................................. 2007-309539

(51) Int. Cl.
*F16H 3/44* (2006.01)

(52) U.S. Cl.
USPC .......................................... 475/296; 475/269

(58) Field of Classification Search .................. 475/269, 475/271–292, 296
See application file for complete search history.

(56) References Cited

U.S. PATENT DOCUMENTS

| | | | |
|---|---|---|---|
| 6,623,397 B1 | 9/2003 | Raghavan et al. | |
| 6,648,791 B2 | 11/2003 | Kao et al. | |
| 6,991,577 B2 | 1/2006 | Usoro et al. | |
| 6,994,649 B2 | 2/2006 | Raghavan et al. | |
| 7,059,994 B2 | 6/2006 | Usoro et al. | |
| 7,094,173 B2 | 8/2006 | Raghavan et al. | |
| 7,108,627 B2 | 9/2006 | Bucknor et al. | |
| 7,153,232 B2 | 12/2006 | Usoro et al. | |
| 7,300,378 B2 | 11/2007 | Raghavan et al. | |
| 7,833,123 B2 | 11/2010 | Hiramatsu | |
| 2004/0053736 A1* | 3/2004 | Usoro et al. | ............. 475/296 |
| 2005/0215383 A1* | 9/2005 | Usoro et al. | ............. 475/288 |
| 2005/0215384 A1* | 9/2005 | Bucknor et al. | ............. 475/290 |
| 2005/0245345 A1* | 11/2005 | Bucknor et al. | ............. 475/275 |
| 2009/0143185 A1 | 6/2009 | Hiramatsu | |
| 2009/0143186 A1 | 6/2009 | Hiramatsu | |

FOREIGN PATENT DOCUMENTS

JP 2004-176765 A 6/2004

OTHER PUBLICATIONS

T. Hiramatsu, U.S. PTO Notice of Allowance, U.S. Appl. No. 12/271,131, dated Jan. 27, 2012, 7 pages.
T. Hiramatsu, U.S. PTO Office Action, U.S. Appl. No. 12/271,131, dated Oct. 18, 2011, 7 pages.
T. Hiramatsu, U.S. PTO Office Action, U.S. Appl. No. 12/271,131, dated May 4, 2011, 8 pages.
T. Hiramatsu, U.S. PTO Notice of Allowance, U.S. Appl. No. 12/271,121, dated May 5, 2011, 10 pages.
T. Hiramatsu, U.S. PTO Office Action, U.S. Appl. No. 12/271,121, dated Jan. 13, 2011, 10 pages.
T. Hiramatsu, U.S. PTO Office Action, U.S. Appl. No. 12/271,131, dated Jan. 28, 2011, 11 pages.

\* cited by examiner

*Primary Examiner* — Roger Pang
*Assistant Examiner* — Huan Le
(74) *Attorney, Agent, or Firm* — Foley & Lardner LLP

(57) ABSTRACT

An automatic transmission includes a first planetary gear set; a second planetary gear set; a third planetary gear set; an input shaft; an output shaft; and five friction elements. A first ring gear is constantly locked. A third carrier is connected with a second ring gear to define a rotating member. The input shaft is constantly connected with a second carrier, and the output shaft is constantly connected with the rotating member. The five friction elements are adapted to selectively connect among the carriers, ring gears and sun gears. Each of at least seven forward speed-ratios and one reverse speed-ratio is achieved by an engaged state of two friction elements selected from the five friction elements.

3 Claims, 10 Drawing Sheets

FIG.2

$\rho_1 = Z_{S1}/Z_{R1} = 0.45$    $\rho_2 = Z_{S2}/Z_{R2} = 0.55$    $\rho_3 = Z_{S3}/Z_{R3} = 0.45$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ◯ | ◯ |  |  |  | $i_1 = (1+\rho_1)(1+\rho_3)/\rho_1$ | 4.672 | 0.214 |
| SECOND SPEED | ◯ |  | ◯ |  |  | $i_2 = (\rho_2(1+\rho_1)(1+\rho_3)+\rho_1)/(\rho_1(1+\rho_2))$ | 2.303 | 0.434 |
| THIRD SPEED | ◯ |  |  | ◯ |  | $i_3 = 1+\rho_3$ | 1.450 | 0.690 |
| FOURTH SPEED | ◯ |  |  |  | ◯ | $i_4 = (1+\rho_2+\rho_2\rho_3)/(1+\rho_2)$ | 1.160 | 0.862 |
| FIFTH SPEED |  |  |  | ◯ | ◯ | $i_5 = 1$ | 1.000 | 1.000 |
| SIXTH SPEED |  | ◯ |  |  | ◯ | $i_6 = (1+\rho_1)/(1+\rho_1+\rho_2)$ | 0.725 | 1.379 |
| SEVENTH SPEED |  |  | ◯ |  | ◯ | $i_7 = 1/(1+\rho_2)$ | 0.645 | 1.550 |
| REVERSE |  |  | ◯ | ◯ |  | $i_R = -\rho_1/(\rho_2-\rho_1)$ | -4.500 | -0.222 |

RATIO COVERAGE : 7.24    (R/1)=0.963

| | REDUCTION GEAR RATIO | 1/REDUCTION GEAR RATIO (NORMALIZED BY HIGHEST SPEED) | DIFFERENCE BETWEEN ADJACENT SPEEDS |
|---|---|---|---|
| FIRST SPEED | 4.672 | 0.138 | 0.138 |
| SECOND SPEED | 2.303 | 0.280 | 0.142 |
| THIRD SPEED | 1.450 | 0.445 | 0.165 |
| FOURTH SPEED | 1.160 | 0.556 | 0.111 |
| FIFTH SPEED | 1.000 | 0.645 | 0.089 |
| SIXTH SPEED | 0.725 | 0.890 | 0.245 |
| SEVENTH SPEED | 0.645 | 1.000 | 0.110 |

| STANDARD DEVIATION | 0.051 |
|---|---|

FIG.7

$\rho_1 = Z_{S1}/Z_{R1} = 0.55 \quad \rho_2 = Z_{S2}/Z_{R2} = 0.5 \quad \rho_3 = Z_{S3}/Z_{R3} = 0.65$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1+\rho_1)(1+\rho_2)/\rho_1$ | 4.227 | 0.237 |
| SECOND SPEED | ○ | | ○ | | | $i_2 = (\rho_1+\rho_3(1+\rho_1)(1+\rho_2))/(\rho_1(1+\rho_3))$ | 2.271 | 0.440 |
| THIRD SPEED | ○ | | | ○ | | $i_3 = 1+\rho_2$ | 1.500 | 0.667 |
| FOURTH SPEED | ○ | | | | ○ | $i_4 = (1+\rho_3+\rho_2\rho_3)/(1+\rho_3)$ | 1.197 | 0.835 |
| FIFTH SPEED | | | | ○ | ○ | $i_5 = 1$ | 1.000 | 1.000 |
| SIXTH SPEED | | ○ | | | ○ | $i_6 = (1+\rho_1)/(1+\rho_1+\rho_3)$ | 0.705 | 1.418 |
| SEVENTH SPEED | | | ○ | | ○ | $i_7 = 1/(1+\rho_3)$ | 0.606 | 1.650 |
| REVERSE | | | ○ | ○ | | $i_R = -\rho_1/(\rho_3-\rho_1)$ | -5.500 | -0.182 |

RATIO COVERAGE : 6.98     (R/1)=1.30

|  | REDUCTION GEAR RATIO | 1/REDUCTION GEAR RATIO (NORMALIZED BY HIGHEST SPEED) | DIFFERENCE BETWEEN ADJACENT SPEEDS |
|---|---|---|---|
| FIRST SPEED | 4.227 | 0.143 | 0.143 |
| SECOND SPEED | 2.271 | 0.267 | 0.123 |
| THIRD SPEED | 1.500 | 0.404 | 0.137 |
| FOURTH SPEED | 1.197 | 0.506 | 0.102 |
| FIFTH SPEED | 1.000 | 0.606 | 0.100 |
| SIXTH SPEED | 0.705 | 0.860 | 0.254 |
| SEVENTH SPEED | 0.606 | 1.000 | 0.140 |

| STANDARD DEVIATION | 0.052 |
|---|---|

FIG.11

$\rho_1 = Z_{S1}/Z_{R1} = 0.45$   $\rho_2 = Z_{S2}/Z_{R2} = 0.45$   $\rho_3 = Z_{S3}/Z_{R3} = 0.55$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1+\rho_1)(1+\rho_2)/\rho_1$ | 4.672 | 0.214 |
| SECOND SPEED | ○ | | ○ | | | $i_2 = (\rho_2 + \rho_3(1+\rho_1)(1+\rho_2))/(\rho_2(1+\rho_3))$ | 2.303 | 0.434 |
| THIRD SPEED | ○ | | | ○ | | $i_3 = 1+\rho_1$ | 1.450 | 0.690 |
| FOURTH SPEED | ○ | | | | ○ | $i_4 = (1+\rho_3+\rho_1\rho_3)/(1+\rho_3)$ | 1.160 | 0.862 |
| FIFTH SPEED | | | | ○ | ○ | $i_5 = 1$ | 1.000 | 1.000 |
| SIXTH SPEED | | ○ | | | ○ | $i_6 = (1+\rho_2)/(1+\rho_2+\rho_3)$ | 0.725 | 1.379 |
| SEVENTH SPEED | | | ○ | | ○ | $i_7 = 1/(1+\rho_3)$ | 0.645 | 1.550 |
| REVERSE | | | ○ | ○ | | $i_R = \rho_2/(\rho_2-\rho_3)$ | -4.500 | -0.222 |

RATIO COVERAGE : 7.24   (R/1) = 0.963

| | REDUCTION GEAR RATIO | 1/REDUCTION GEAR RATIO (NORMALIZED BY HIGHEST SPEED) | DIFFERENCE BETWEEN ADJACENT SPEEDS |
|---|---|---|---|
| FIRST SPEED | 4.672 | 0.138 | 0.138 |
| SECOND SPEED | 2.303 | 0.280 | 0.142 |
| THIRD SPEED | 1.450 | 0.445 | 0.165 |
| FOURTH SPEED | 1.160 | 0.556 | 0.111 |
| FIFTH SPEED | 1.000 | 0.645 | 0.089 |
| SIXTH SPEED | 0.725 | 0.890 | 0.245 |
| SEVENTH SPEED | 0.645 | 1.000 | 0.110 |

| STANDARD DEVIATION | 0.051 |
|---|---|

FIG. 14

$\rho_1 = Z_{S1}/Z_{R1} = 0.6 \quad \rho_2 = Z_{S2}/Z_{R2} = 0.4 \quad \rho_3 = Z_{S3}/Z_{R3} = 0.5$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = 1 + \rho_3 + \rho_3/\rho_2$ | 2.750 | 0.371 |
| SECOND SPEED | ○ | | ○ | | | $i_2 = 1 + \rho_3(1+\rho_2)/(\rho_2(1+\rho_1))$ | 2.094 | 0.478 |
| THIRD SPEED | ○ | | | ○ | | $i_3 = 1 + \rho_3$ | 1.500 | 0.667 |
| FOURTH SPEED | ○ | | | | ○ | $i_4 = 1$ | 1.000 | 1.000 |
| FIFTH SPEED | | | | ○ | ○ | $i_5 = \rho_1(1+\rho_3)/(\rho_1+\rho_3+\rho_1\rho_3)$ | 0.643 | 1.555 |
| SIXTH SPEED | | ○ | | | ○ | $i_6 = \rho_1(\rho_2+\rho_3+\rho_2\rho_3)/(\rho_1\rho_2+\rho_3+\rho_3(1+\rho_1)(1+\rho_2))$ | 0.485 | 2.062 |
| SEVENTH SPEED | | | ○ | | ○ | $i_7 = \rho_1/(1+\rho_1)$ | 0.375 | 2.667 |
| REVERSE | | | ○ | ○ | | $i_R = \rho_1\rho_2(1+\rho_3)/(\rho_1\rho_2+\rho_1\rho_2\rho_3-\rho_3)$ | -2.571 | -0.389 |

RATIO COVERAGE : 7.33 (R/1)=0.935

8,439,794 B2

AUTOMATIC TRANSMISSION

CROSS-REFERENCE TO RELATED APPLICATIONS

This application is a Divisional of U.S. application Ser. No. 12/271,115, filed Nov. 14, 2008, which is based upon and claims the benefit of priority from prior Japanese Patent Application No. 2007-309539, filed Nov. 29, 2007, the entire contents of which are incorporated herein by reference.

BACKGROUND OF THE INVENTION

The present invention relates to a step automatic transmission employed as a transmission for vehicle.

Japanese Patent Application Publication No. 2004-176765 or U.S. Pat. No. 6,648,791 (FIGS. 23 to 26) discloses an automatic transmission adapted to achieve forward seven speed-ratios by using three planetary gear sets. In the automatic transmission disclosed in the above Japanese Patent Application, the forward seven speed-ratios are obtained by using six friction elements and three single-pinion-type planetary gear sets. This single-pinion-type planetary gear set has an advantage in transfer efficiency and gear noise and also an advantage in durability because of the nonnecessity for reducing a diameter of pinion gear. Moreover similarly, the automatic transmission disclosed in the above United States Patent achieves forward six speed-ratios to forward eight speed-ratios by using five friction elements and three single-pinion-type planetary gear sets.

SUMMARY OF THE INVENTION

However, in the technique disclosed in the above Japanese Patent Application, at least six friction elements are necessary to achieve the seven forward speed-ratios. Therefore, there is a problem that the number of friction elements is large so that an increase of the number of components and an increase in axial length are incurred.

Since the number of friction elements provided for achieving the forward six to eight speed-ratios is five in the technique of the above United States Patent, there is an advantage that the number of friction elements is small as compared with that of the above Japanese Patent Application, so that the number of components can be reduced. However, in the automatic transmission shown in FIG. 23 of the above United States Patent, members passing on a radially outer side of a ring gear of center one of three planetary gear sets form a three-layered structure. Generally, in the automatic transmission, lubricating oil is released from a shaft-center side by means of centrifugal force and then is collected into an oil pan provided in a lower portion of the automatic transmission via respective parts requiring to be lubricated. In the case that the connecting members such as a drum member are provided in a multilayer structure on the radially outer side of planetary gear set, the lubricating oil is easy to be retained inside the above-mentioned members. Since many of these members rotate at the time of vehicle running, there is a problem that respective frictions are increased to worsen a fuel economy.

On the other hand, in the technique shown in FIG. 25 of the above United States Patent, members passing on the radially outer side of planetary gear set are provided in a two-layered form. Hence, lubricating oil is resistant to the retention (a disrupted flow) as compared to the technique of FIG. 23. However, a multi-shaft structure, concretely three-layered structure at a maximum is formed on a radially inner side of a sun gear of input-shaft-side one of three planetary gear sets. Hence, dimensions of the sun gear are restricted so that there is a problem that a degree of freedom to design a gear ratio of the input-shaft-side planetary gear set is low. In the case of trying to secure a sufficient value of gear ratio of planetary gear set in this technique, another problem is caused that dimensions of the planetary gear set are upsized so as to upsize the outside dimensions of automatic transmission.

It is an object of the present invention to provide an automatic transmission that is capable of achieving seven forward speed-ratios by means of three simple planetary gear sets and five friction elements, and that is devised to reduce members passing on the radially outer side of planetary gear set and/or devised to reduce the number of shafts passing on the radially inner side of planetary gear set.

According to one aspect of the present invention, there is provided an automatic transmission comprising: a first planetary gear set including a first sun gear, a first pinion engaged with the first sun gear, a first carrier supporting the first pinion, and a first ring gear engaged with the first pinion and constantly locked; a second planetary gear set including a second sun gear, a second pinion engaged with the second sun gear, a second carrier supporting the second pinion, and a second ring gear engaged with the second pinion; a third planetary gear set including a third sun gear, a third pinion engaged with the third sun gear, a third carrier supporting the third pinion, the third carrier being connected with the second ring gear to define a rotating member, and a third ring gear engaged with the third pinion; an input shaft constantly connected with the second carrier; an output shaft constantly connected with the rotating member; and five friction elements including a first friction element adapted to selectively connect the first carrier with the third ring gear, a second friction element adapted to selectively connect the first sun gear with the second carrier, a third friction element adapted to selectively connect the first sun gear with the second sun gear, a fourth friction element adapted to selectively connect the first carrier with the second carrier, and a fifth friction element adapted to selectively connect the first carrier with the second sun gear, the automatic transmission being adapted to achieve at least seven forward speed-ratios and one reverse speed-ratio, each of the at least seven forward speed-ratios and one reverse speed-ratio being achieved by an engaged state of two friction elements selected from the five friction elements.

According to another aspect of the present invention, there is provided an automatic transmission comprising: a first planetary gear set including a first sun gear, a first pinion engaged with the first sun gear, a first carrier supporting the first pinion, and a first ring gear engaged with the first pinion and constantly locked; a second planetary gear set including a second sun gear constantly locked, a second pinion engaged with the second sun gear, a second carrier supporting the second pinion, and a second ring gear engaged with the second pinion, and connected with the first carrier to define a rotating member; a third planetary gear set including a third sun gear, a third pinion engaged with the third sun gear, a third carrier supporting the third pinion, and a third ring gear engaged with the third pinion; an input shaft constantly connected with the third carrier; an output shaft constantly connected with third ring gear; and five friction elements including a first friction element adapted to selectively connect the second carrier with the third ring gear, a second friction element adapted to selectively connect the first sun gear with the third carrier, a third friction element adapted to selectively connect the first sun gear with the third sun gear, a fourth friction element adapted to selectively connect the rotating member with the third carrier, and a fifth friction element adapted to selectively connect the rotating member with the third sun gear, the automatic transmission being adapted to achieve at least seven forward speed-ratios and one reverse speed-ratio, each of the at least seven forward speed-ratios and one reverse speed-ratio being achieved by an engaged state of two friction elements selected from the five friction elements.

According to still another aspect of the present invention, there is provided an automatic transmission comprising: a first planetary gear set including a first sun gear, a first pinion engaged with the first sun gear, a first carrier supporting the first pinion, and a first ring gear engaged with the first pinion; a second planetary gear set including a second sun gear, a second pinion engaged with the second sun gear, a second carrier supporting the second pinion, and a second ring gear engaged with the second pinion and constantly locked; a third planetary gear set including a third sun gear, a third pinion engaged with the third sun gear, a third carrier supporting the third pinion, and a third ring gear engaged with the third pinion, the third ring gear being connected with the first carrier to define a first rotating member, the first ring gear being connected with the second carrier to define a second rotating member; an input shaft constantly connected with the third carrier; an output shaft constantly connected with the first rotating member; and five friction elements including a first friction element adapted to stop a rotation of the first sun gear, a second friction element adapted to selectively connect the third sun gear with the third carrier, a third friction element adapted to selectively connect the second sun gear with the third sun gear, a fourth friction element adapted to selectively connect the second rotating member with the third carrier, and a fifth friction element adapted to selectively connect the second rotating member with the third sun gear, the automatic transmission being adapted to achieve at least seven forward speed-ratios and one reverse speed-ratio, each of the at least seven forward speed-ratios and one reverse speed-ratio being achieved by an engaged state of two friction elements selected from the five friction elements.

According to still another aspect of the present invention, there is provided an automatic transmission comprising: a first planetary gear set including a first sun gear, a first pinion engaged with the first sun gear, a first carrier supporting the first pinion, and a first ring gear engaged with the first pinion; a second planetary gear set including a second sun gear, a second pinion engaged with the second sun gear, a second carrier supporting the second pinion, and a second ring gear engaged with the second pinion; a third planetary gear set including a third sun gear constantly locked, a third pinion engaged with the third sun gear, a third carrier supporting the third pinion, and a third ring gear engaged with the third pinion, the third ring gear being connected with the second carrier to define a first rotating member, the second ring gear being connected with the third carrier to define a second rotating member; an input shaft constantly connected with the first carrier; an output shaft constantly connected with the first sun gear; and five friction elements including a first friction element adapted to selectively connect the first sun gear with the second rotating member, a second friction element adapted to selectively connect the second sun gear with the first carrier, a third friction element adapted to selectively connect the second sun gear with the first ring gear, a fourth friction element adapted to selectively connect the first rotating member with the first carrier, and a fifth friction element adapted to selectively connect the second rotating member with the first ring gear, the automatic transmission being adapted to achieve at least seven forward speed-ratios and one reverse speed-ratio, each of the at least seven forward speed- ratios and one reverse speed-ratio being achieved by an engaged state of two friction elements selected from the five friction elements.

The other objects and features of this invention will become understood from the following description with reference to the accompanying drawings.

BRIEF DESCRIPTION OF THE DRAWINGS

FIG. 2 is a diagram showing a concrete example of an engagement table of friction elements and reduction gear ratios in the automatic transmission according to the first embodiment.

FIG. 7 is a diagram showing a concrete example of an engagement table of friction elements and reduction gear ratios in the automatic transmission according to the second embodiment.

FIG. 11 is a diagram showing a concrete example of an engagement table of friction elements and reduction gear ratios in the automatic transmission according to the third embodiment.

FIG. 14 is a diagram showing a concrete example of an engagement table of friction elements and reduction gear ratios in the automatic transmission according to the fourth embodiment.

DETAILED DESCRIPTION OF THE INVENTION

Reference will hereinafter be made to the drawings in order to facilitate a better understanding of the present invention.

First Embodiment

Figure 1:
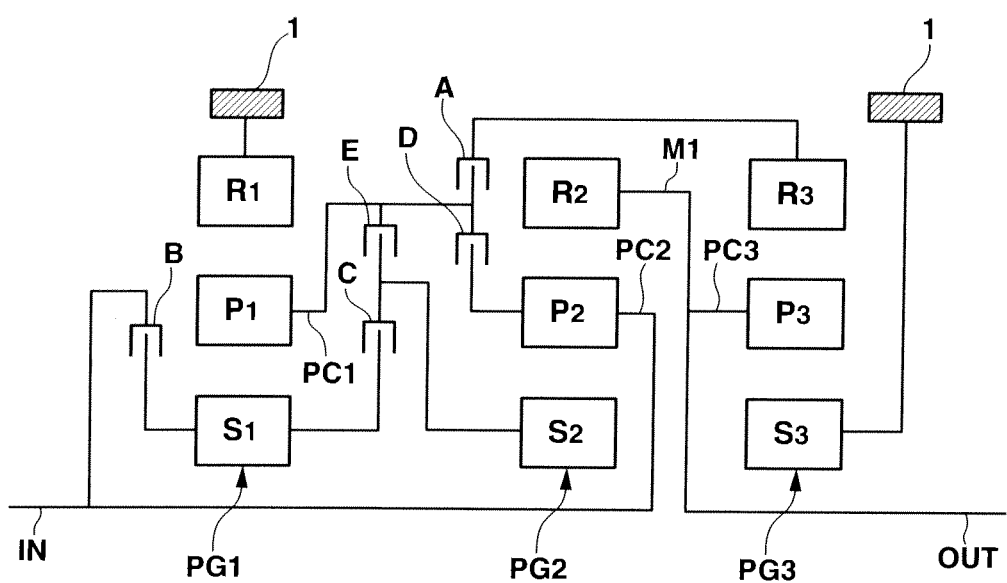
FIG. 1 is a skeleton diagram showing an automatic transmission according to a first embodiment of the present invention.

At first, structures of a shift mechanism of a step automatic transmission according to a first embodiment of the present invention will now be explained. FIG. 1 is a skeleton diagram showing the shift mechanism of the step (multiple-step type) automatic transmission according to the first embodiment. FIG. 2 is a diagram showing a concrete example of a table regarding engagements of friction elements and reduction gear ratios (speed reducing ratios) in the automatic transmission according to the first embodiment.

The automatic transmission according to the first embodiment includes a first planetary gear set PG1, a second planetary gear set PG2 and a third planetary gear set PG3, as a gear train, as shown in FIG. 1. Each of the three planetary gear sets PG1, PG2 and PG3 is of single-pinion type. First planetary gear set PG1 includes a first sun gear S1, a first ring gear R1, and a first pinion P1 engaged or meshed with first sun gear S1 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3.

An input shaft IN is always connected (or engaged) with second carrier PC2 (i.e., constantly rotates together with second carrier PC2). Second ring gear R2 is always connected with third carrier PC3 to form a first rotating member M1. An output shaft OUT is always connected with first rotating member M1. First ring gear R1 is always locked relative to a transmission case 1 (i.e., constantly fastened to the transmission case 1). Third sun gear S3 is always locked relative to transmission case 1.

The automatic transmission further includes five clutches, i.e., first to fifth friction elements A, B, C, D and E. The first friction element A is provided between first carrier PC1 and third ring gear R3, and is adapted to selectively connect (engage) first carrier PC1 with third ring gear R3. The second friction element B is provided between first sun gear S1 and second carrier PC2, and is adapted to selectively connect first sun gear S1 with second carrier PC2. The third friction element C is provided between first sun gear S1 and second sun gear S2, and is adapted to selectively connect first sun gear S1 with second sun gear S2. The fourth friction element D is provided between first carrier PC1 and second carrier PC2, and is adapted to selectively connect first carrier PC1 with second carrier PC2. The fifth friction element E is provided between first carrier PC1 and second sun gear S2, and is adapted to selectively connect first carrier PC1 with second sun gear S2.

Output shaft OUT is provided with an output gear or the like to transmit rotational driving force through a differential gear and a drive shaft to a drive wheel, which are not shown. In the case of the first embodiment, since output shaft OUT is not obstructed by the other member or the like, the automatic transmission is applicable to both of FF vehicle (front-engine front-drive vehicle) and FR vehicle (front-engine rear-drive vehicle).

The relations in engagements (connections) of the friction elements under respective speed-ratios (i.e., respective steps for shift) will be explained below referring to the engagement table of FIG. 2 (these engagements for respective speed-ratios are attained by a shift control section or means). In the table of FIG. 2, the sign ○ represents the engagement (engaged state), and the blank represents the disengagement (released state).

At first, the states at the time of forward running will now be explained. A first-speed (first speed-ratio) is achieved by engaging first friction element A and second friction element B. A second-speed is achieved by engaging first friction element A and third friction element C. A third-speed is achieved by engaging first friction element A and fourth friction element D. A fourth-speed is achieved by engaging first friction element A and fifth friction element E. A fifth-speed is achieved by engaging fourth friction element D and fifth friction element E. A sixth-speed is achieved by engaging second friction element B and fifth friction element E. A seventh-speed is achieved by engaging third friction element C and fifth friction element E. Next, the state at the time of reverse running is now explained. A reverse-speed is achieved by engaging third friction element C and fourth friction element D.

Next, a concrete example of the reduction gear ratios according to the first embodiment will now be explained referring to FIG. 2. The following explanations are given in the case where a gear ratio $\rho 1=ZS1/ZR1$ of first planetary gear set PG1 is equal to 0.45 (i.e., $\rho 1=ZS1/ZR1=0.45$), a gear ratio $\rho 2=ZS2/ZR2$ of second planetary gear set PG2 is equal to 0.55 (i.e., $\rho 2=ZS2/ZR2=0.55$), and a gear ratio $\rho 3=ZS3/ZR3$ of third planetary gear set PG3 is equal to 0.45 (i.e., $\rho 3=ZS3/ZR3=0.45$). Where, each of ZS1, ZS2, ZS3, ZR1, ZR2 and ZR3 represents the number of teeth of the corresponding gear.

A reduction gear ratio i1 of the first-speed in the forward running is expressed by a formula: $i1=(1+\rho 1)(1+\rho 3)/\rho 1$. By assigning the concrete numerical values to this formula, reduction gear ratio i1 of the forward first-speed is calculated as i1=4.672. The inverse of reduction gear ratio i1 is equal to 0.214.

A reduction gear ratio i2 of the second-speed in the forward running is expressed by a formula: $i2=(\rho 2(1+\rho 1)(1+\rho 3)+\rho 1)/(\rho 1(1+\rho 2))$. By assigning the concrete numerical values to this formula, reduction gear ratio i2 of the forward second-speed is calculated as i2=2.303. The inverse of reduction gear ratio i2 is equal to 0.434.

A reduction gear ratio i3 of the third-speed in the forward running is expressed by a formula: $i3=1+\rho 3$. By assigning the concrete numerical values to this formula, reduction gear ratio i3 of the forward third-speed is calculated as i3=1.450. The inverse of reduction gear ratio i3 is equal to 0.690.

A reduction gear ratio i4 of the fourth-speed in the forward running is expressed by a formula: $i4=(1+\rho 2+\rho 2\rho 3)/(1+\rho 2)$. By assigning the concrete numerical values to this formula, reduction gear ratio i4 of the forward fourth-speed is calculated as i4=1.160. The inverse of reduction gear ratio i4 is equal to 0.862.

A reduction gear ratio i5 of the fifth-speed in the forward running is expressed by a formula: $i5=1.0$. Without assigning the concrete numerical values to this formula, reduction gear ratio i5 of the forward fifth-speed is equal to 1.000. The inverse of reduction gear ratio i5 is equal to 1.000.

A reduction gear ratio i6 of the sixth-speed in the forward running is expressed by a formula: $i6=(1+\rho 1)/(1+\rho 1+\rho 2)$. By assigning the concrete numerical values to this formula, reduction gear ratio i6 of the forward sixth-speed is calculated as i6=0.725. The inverse of reduction gear ratio i6 is equal to 1.379.

A reduction gear ratio i7 of the seventh-speed in the forward running is expressed by a formula: $i7=1/(1+\rho 2)$. By assigning the concrete numerical values to this formula, reduction gear ratio i7 of the forward seventh-speed is calculated as i7=0.645. The inverse of reduction gear ratio i7 is equal to 1.550.

A reduction gear ratio iR of the reverse-speed is expressed by a formula: $iR=-\rho 1/(\rho 2-\rho 1)$. By assigning the concrete numerical values to this formula, reduction gear ratio iR of the reverse-speed is calculated as iR=−4.500. The inverse of reduction gear ratio iR is equal to −0.222.

Figures 3, 4:
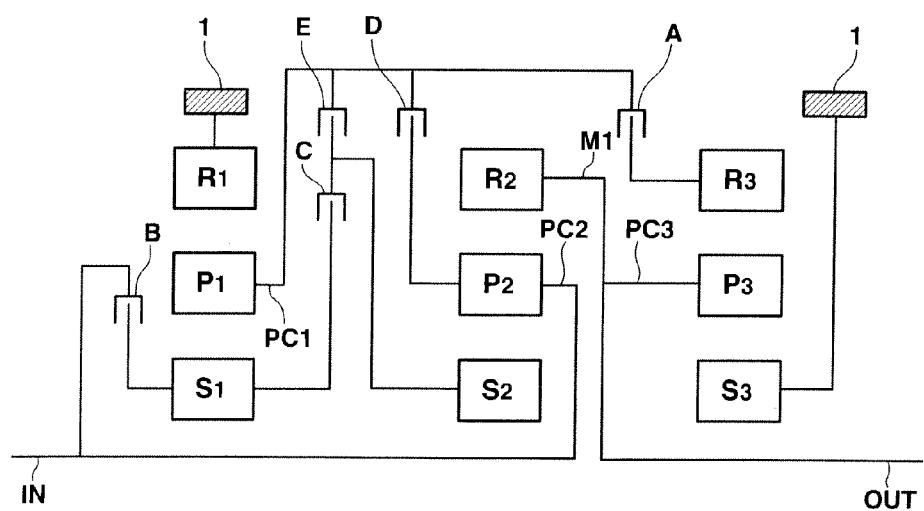
FIG. 3 is a view showing differences between respective first to seventh speeds according to the first embodiment.
FIG. 4 is a skeleton diagram showing an automatic transmission according to a first modified example of the first embodiment.

Next, a characteristic of the respective reduction gear ratios in the first embodiment is explained referring to FIG. 3. FIG. 3 is a table showing interrelations among the respective speed-ratios obtained by the automatic transmission in the first embodiment. It is proper that a ratio between speed-ratios (i.e., relation among respective speed-ratios, also called a step ratio) is evaluated based on how close a so-called V1000 is to arithmetic series (arithmetic progression). This V1000 is comparable to a vehicle-speed range which each speed-ratio is in charge of (a vehicle-speed range which each step for shift covers). That is, in the case where the V1000 is allocated in a manner of arithmetic series, each of the in-charge vehicle-speed ranges in respective speed-ratios has an equivalent width to one another. In this case, particularly; an upshift attains a rhythmical shift, and a selection of speed-ratio is conducted with no difficulty on a downhill or uphill road, so that the automatic transmission having a superior drivability can be achieved.

In order to quantitatively determine how the V1000 has deviated or departed from the arithmetic series, the following procedure is used. That is, the inverses of reduction gear ratio values under the respective speed-ratios are normalized by regarding the inverse of reduction gear ratio value under the highest-step speed-ratio (seventh-speed) as a value equal to 1, and then a deviation degree (amount) of these normalized values from the arithmetic series is quantitatively calculated. In the automatic transmission according to the first embodiment, a standard deviation calculated is equal to 0.051 which is recognized as an extremely small value.

Effects According to the First Embodiment

①Effects by Virtue of Structural Skeleton as a Whole

In the first embodiment, the automatic transmission capable of attaining the seven speeds of forward running and the one speed of reverse running can be realized with proper reduction gear ratios being ensured; although the automatic transmission is constructed by a limited number of simple constructional elements, namely, the three sets of simple (single) planet gears (three single-pinion-type planetary gear sets) and the five friction elements.

②Effects by Virtue of the Usage of Three Simple Planetary Gear Sets

Because of the usage of the three sets of simple planet gears (the usage of three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, a gear durability can be enhanced.

③Effects Based on Gear Ratios

All of the gear ratios $\rho 1$, $\rho 2$ and $\rho 3$ in the respective planetary gear sets are close to a center value 0.5. Accordingly, a possible range which is obtained by freely setting the three gear ratios is wide so that a degree of freedom in reduction gear ratio can become higher.

④Effects Based on a Ratio Coverage in the Forward Running

A ratio coverage (gear-ratio width) of the forward running is defined by dividing the reduction gear ratio of the lowest-speed (step) by the reduction gear ratio of the highest-speed (step), i.e., the reduction gear ratio of the lowest-speed/the reduction gear ratio of the highest-speed. It can be described that a compatibility between an accelerating performance at the time of vehicle start and a fuel economy at the time of high speed cruise of vehicle becomes better, and also a degree of freedom to set the gear ratio value in respective forward speed-ratios becomes higher; as the value of ratio coverage becomes greater. As concrete numerical values in the first embodiment, the reduction gear ratio of the forward first-speed is equal to 4.672 and the reduction gear ratio of the forward seventh-speed is equal to 0.645. In this embodiment, the ratio coverage from first-speed to seventh-speed is equal to 7.24, and hence a sufficient ratio coverage can be ensured. Therefore, for example, the automatic transmission according to the first embodiment is useful also as a transmission for a vehicle equipped with a diesel engine as its power source, although a width of rotational speed (number of revolutions) of diesel engine is narrower than that of a gasoline engine and a torque of diesel engine is higher than that of a gasoline engine having the same engine displacement.

Moreover, in the case where the gear ratio value of the low-speed side is great relative to the ratio coverage, a torque transmitted to a final gear becomes relatively great. Hence, this case requires a sufficient strength of the automatic transmission or propeller shaft, so that the whole of vehicle body is upsized. That is, it is preferable that the gear ratio value (value of speed ratio) of the lowest-speed is not so great under the same condition of ratio coverage. In an automatic transmission shown by FIG. 23 in the document of U.S. Pat. No. 6,648,791, a gear ratio of the highest-speed (highest step for shift) is equal to 1. Hence in this technique, when trying to enlarge the ratio coverage, a gear ratio (value) of the lowest-speed (lowest step for shift) needs to be enlarged, so that the upsizing of the automatic transmission and the propeller shaft is caused. On the other hand, in the automatic transmission according to the first embodiment of the present invention, a sufficient ratio coverage can be ensured without the necessity of enlarging the gear ratio of the lowest-speed so much.

⑤Effects Based on 1-R Ratio

A value of 1-R ratio (Reverse-speed/First-speed) is a value near 1, concretely, equal to 0.963. Accordingly, an acceleration feel of vehicle relative to a depressing adjustment of an accelerator pedal does not greatly vary between at the time of forward running and at the time of reverse running. Therefore, the problem that the drivability worsens can be avoided.

⑥Effects Based on Standard Deviation Related to the V1000

Since the standard deviation can be made an extremely small value (for example, 0.051 in this embodiment), the widths of the vehicle-speed ranges in the respective speed-ratios (the respective steps for shift) are equivalent to one another. Accordingly, particularly, the upshift attains a rhythmical shift, and the selection of reduction gear ratio is conducted with no difficulty on a downhill or uphill road, so that the automatic transmission having a superior drivability can be provided.

⑦Effects Based on the Number of Changeovers Among the Friction Elements at the Time of Shift (i) If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and another friction element is engaged at the time of shift. That is, it is favorable that a so-called double-changeover is avoided. In the first embodiment, the shifts among the forward first-speed to the forward fourth-speed are performed under the condition where first friction element A is maintained in engaged state. Moreover, the shifts among the forward fourth-speed to the forward seventh-speed are performed under the condition where fifth friction element E is maintained in engaged state. Namely, each shift between adjacent two speed-ratios (gear steps) among the forward first-speed to seventh-speed can be achieved by releasing one friction element and by engaging one friction element. Accordingly, each of all the shifts between adjacent two speed-ratios of forward running is performed by means of only the changeover from one friction element to the other one friction element. Therefore, the control during the shift can be prevented from being complicated.

(ii) As mentioned in the above (i), all the shifts between adjacent two speed-ratios can be achieved by the changeover shift which releases one friction element and engages one friction element. Moreover, similarly, each one-ratio-skip shift (all one-ratio-skip shifts, e.g., forward first-speed→forward third-speed) among the forward first- to seventh-speeds can also be achieved by releasing one friction element and by engaging the other one friction element. Accordingly, a controllability thereof can be enhanced.

⑧Effects Based on Layout (i) In the automatic transmission according to the first embodiment, on a radially outer side of the three planetary gear sets, connecting members are disposed so as not to become in a three-layered form, as shown in the skeleton diagram of FIG. 1. That is, the number of the connecting members radially covered or overlapped with each other radially outside each planetary gear set is smaller than three. Accordingly, it becomes difficult to cause the retention of a lubricating oil (disrupted flow of lubricating oil), so that the fuel economy can be improved by reducing the frictions.

(ii) A member passing on a radially inner side of the three planetary gear sets is disposed in a single-shaft structure. That is, the number of members (shafts) passing through a radially inside space (of the sun gear) of each planetary gear set is equal to 1. Accordingly, dimensions (size) of each sun gear are not restricted as compared with the technique disclosed in the document of U.S. Pat. No. 6,648,791, and a degree of freedom to design the ratio between teeth numbers in each planetary gear set is high so that a degree of freedom to design the automatic transmission can be enhanced.

(iii) Moreover, the rotating member passing on the outer peripheral side of the planetary gear sets is formed in a single-layered structure, as shown by the skeleton diagram of FIG. 1. Generally in the automatic transmission, lubricating oil is always supplied to respective rotating elements such as gears and bearings (not shown) for the purpose of cooling, lubrication and the like. This lubricating oil is generally supplied from a shaft-center side of the transmission by means of centrifugal force. At this time, if an efficiency of discharge (retrieving performance) of lubricating oil becomes worsened on the outer peripheral side of the planetary gear sets, oil temperature rises so that a durability of friction elements, bearings and the like is reduced. Since the rotating member passing on the outer peripheral side of the planetary gear sets forms the single-layered structure in the first embodiment as mentioned above, the discharging efficiency of lubricating oil is not worsened so that the temperature rise is suppressed to improve the durability.

(iv) The automatic transmission according to the first embodiment can be designed to allow torque to be inputted to one side of the planetary gear sets and then to be outputted from another side of the planetary gear sets. Accordingly, the automatic transmission according to the first embodiment is applicable to both of a front-wheel drive vehicle and a rear-wheel drive vehicle, namely can be widely applied.

First Modified Example

Next, a first modified example of the first embodiment according to the present invention will now be explained. Since a basic structure of the first modified example is the same as that of the pre-modified example explained above, only structural parts of the first modified example which are different from the above pre-modified example are now explained.

FIG. 4 is a skeleton diagram showing the first modified example. In the above pre-modified example, all of first friction element A, third friction element C, fourth friction element D and fifth friction element E are located between first planetary gear set PG1 and second planetary gear set PG2. Contrary to this, in the first modified example, first friction element A is placed between second planetary gear set PG2 and third planetary gear set PG3.

Second Modified Example

Figure 5:
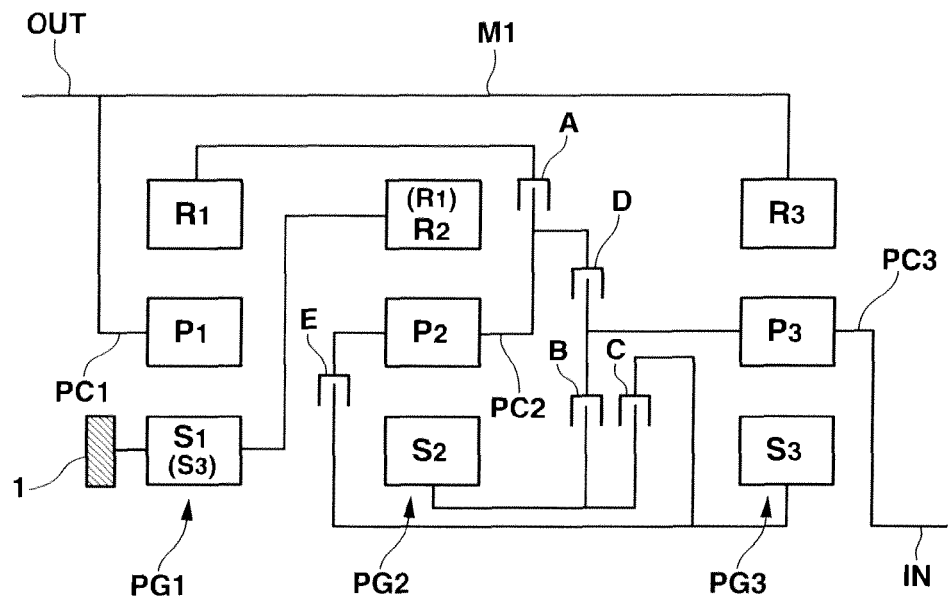
FIG. 5 is a skeleton diagram showing an automatic transmission according to a second modified example of the first embodiment.

Next, a second modified example of the first embodiment according to the present invention will now be explained. Since a basic structure of the second modified example is the same as that of the above pre-modified example of the first embodiment, only structural parts of the second modified example which are different from the pre-modified example are now explained. In the above pre-modified example; the three single-pinion-type planetary gear sets, first planetary gear set PG1, second planetary gear set PG2 and third planetary gear set PG3 as the gear train are disposed in this order from the input side (first planetary gear set PG1→second planetary gear set PG2→third planetary gear set PG3). Contrary to this, in the second modified example, the three planetary gear sets are disposed in order as second planetary gear set PG2→first planetary gear set PG1→third planetary gear set PG3 from the input side. FIG. 5 gives respective reference signs to the three planetary gear sets in the order as first planetary gear set PG1→second planetary gear set PG2→third planetary gear set PG3 from the left side of FIG. 5. However, in a correspondence relation with the pre-modified example; first planetary gear set PG1 of the second modified example corresponds to third planetary gear set PG3 of the pre-modified example, second planetary gear set PG2 of the second modified example corresponds to first planetary gear set PG1 of the pre-modified example, and third planetary gear set PG3 of the second modified example corresponds to second planetary gear set PG2 of the pre-modified example.

In this modified example, the three planetary gear sets are arranged in such a manner that second planetary gear set PG2 (which corresponds to first planetary gear set PG1 of the pre-modified example) is disposed axially between third planetary gear set PG3 and first planetary gear set PG1 (which correspond to second planetary gear set PG2 and third planetary gear set PG3 of the pre-modified example). Accordingly, a first rotating member M1 composed of third ring gear R3 and first carrier PC1 (i.e., first rotating member M1 composed of second ring gear R2 and third carrier PC3 of the pre-modified example) covers the three planetary gear sets from the outer peripheral side thereof. Accordingly, the automatic transmission in the second modified example is mainly applied to a front-wheel drive vehicle.

All of the positional relations of respective friction elements, the connecting relations of respective rotating members, and the engagement relations of friction elements under the respective speed-ratios are the same as those in the pre-modified example.

Second Embodiment

Figure 6:
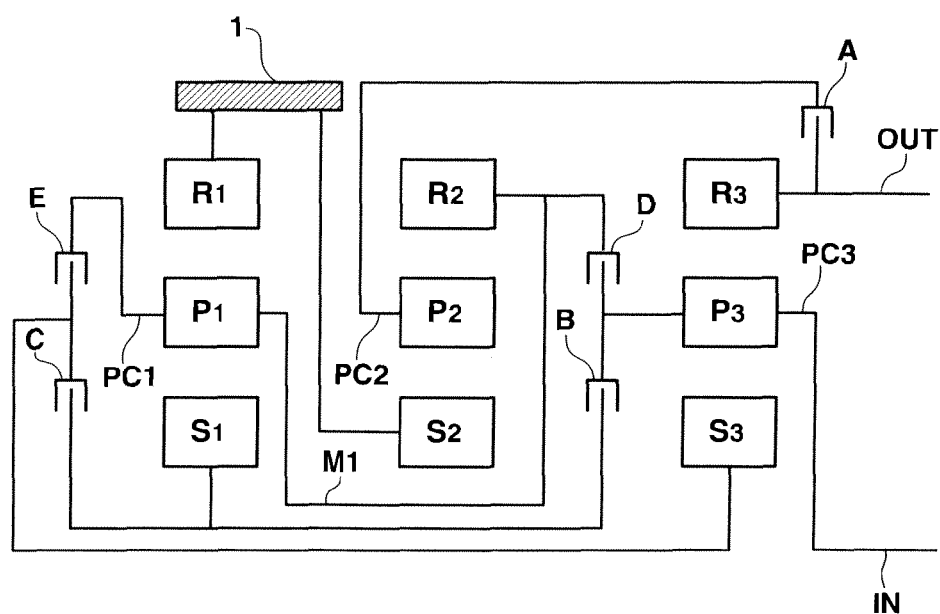
FIG. 6 is a skeleton diagram showing an automatic transmission according to a second embodiment of the present invention.

At first, structures according to a second embodiment of the present invention will now be explained. FIG. 6 is a skeleton diagram showing the shift mechanism of a step (multiple-step type) automatic transmission according to the second embodiment. FIG. 7 is a diagram showing a concrete example of a table regarding engagements of friction elements and reduction gear ratios (speed reducing ratios) in the automatic transmission according to the second embodiment.

The automatic transmission according to the second embodiment includes a first planetary gear set PG1, a second planetary gear set PG2 and a third planetary gear set PG3, as a gear train, as shown in FIG. 6. Each of the three planetary gear sets PG1, PG2 and PG3 is of single-pinion type. First planetary gear set PG1 includes a first sun gear S1, a first ring gear R1, and a first pinion P1 engaged or meshed with first sun gear S1 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3.

An input shaft IN is always connected (or engaged) with third carrier PC3 (i.e., constantly rotates together with third carrier PC3). Second ring gear R2 is always connected with first carrier PC1 to form a first rotating member M1. An output shaft OUT is always connected with third ring gear R3. First ring gear R1 is always locked relative to a transmission case 1 (i.e., constantly fastened to the transmission case 1). Second sun gear S2 is always locked relative to transmission case 1.

The automatic transmission further includes five clutches, i.e., first to fifth friction elements A, B, C, D and E. The first friction element A is provided between second carrier PC2 and third ring gear R3, and is adapted to selectively connect (engage) second carrier PC2 with third ring gear R3. The second friction element B is provided between first sun gear S1 and third carrier PC3, and is adapted to selectively connect first sun gear S1 with third carrier PC3. The third friction element C is provided between first sun gear S1 and third sun gear S3, and is adapted to selectively connect first sun gear S1 with third sun gear S3. The fourth friction element D is provided between second ring gear R2 and third carrier PC3, and is adapted to selectively connect second ring gear R2 with third carrier PC3. The fifth friction element E is provided between first carrier PC1 and third sun gear S3, and is adapted to selectively connect first carrier PC1 with third sun gear S3.

Output shaft OUT is provided with an output gear or the like to transmit rotational driving force through a differential gear and a drive shaft to a drive wheel, which are not shown. In the case of the second embodiment, since output shaft OUT is obstructed by first ring gear R1, second sun gear S2 or the like, the automatic transmission is applicable to a FF vehicle (front-engine front-drive vehicle).

The relations in engagements (connections) of the friction elements under respective speed-ratios (i.e., respective steps for shift) will be explained below referring to the engagement table of FIG. 7 (these engagements for respective speed-ratios are attained by a shift control section or means). In the table of FIG. 7, the sign ○ represents the engagement, and the blank represents the disengagement.

At first, the states at the time of forward running will now be explained. A first-speed (first speed-ratio) is achieved by engaging first friction element A and second friction element B. A second-speed is achieved by engaging first friction element A and third friction element C. A third-speed is achieved by engaging first friction element A and fourth friction element D. A fourth-speed is achieved by engaging first friction element A and fifth friction element E. A fifth-speed is achieved by engaging fourth friction element D and fifth friction element E. A sixth-speed is achieved by engaging second friction element B and fifth friction element E. A seventh-speed is achieved by engaging third friction element C and fifth friction element E. Next, the state at the time of reverse running is now explained. A reverse-speed is achieved by engaging third friction element C and fourth friction element D.

Next, a concrete example of the reduction gear ratios according to the second embodiment will now be explained referring to FIG. 7. The following explanations are given in the case where a gear ratio $\rho 1=ZS1/ZR1$ of first planetary gear set PG1 is equal to 0.55 (i.e., $\rho 1=ZS1/ZR1=0.55$), a gear ratio $\rho 2=ZS2/ZR2$ of second planetary gear set PG2 is equal to 0.50 (i.e., $\rho 2=ZS2/ZR2=0.50$), and a gear ratio $\rho 3=ZS3/ZR3$ of third planetary gear set PG3 is equal to 0.65 (i.e., $\rho 3=ZS3/ZR3=0.65$). Where, each of ZS1, ZS2, ZS3, ZR1, ZR2 and ZR3 represents the number of teeth of the corresponding gear.

A reduction gear ratio i1 of the first-speed in the forward running is expressed by a formula: $i1=(1+\rho 1)(1+\rho 2)/\rho 1$. By assigning the concrete numerical values to this formula, reduction gear ratio i1 of the forward first-speed is calculated as i1=4.227. The inverse of reduction gear ratio i1 is equal to 0.237.

A reduction gear ratio i2 of the second-speed in the forward running is expressed by a formula: $i2=(\rho 1+\rho 3(1+\rho 1)(1+\rho 2))/(\rho 1(1+\rho 3))$. By assigning the concrete numerical values to this formula, reduction gear ratio i2 of the forward second-speed is calculated as i2=2.271. The inverse of reduction gear ratio i2 is equal to 0.440.

A reduction gear ratio i3 of the third-speed in the forward running is expressed by a formula: $i3=1+\rho 2$. By assigning the concrete numerical values to this formula, reduction gear ratio i3 of the forward third-speed is calculated as i3=1.500. The inverse of reduction gear ratio i3 is equal to 0.667.

A reduction gear ratio i4 of the fourth-speed in the forward running is expressed by a formula: $i4=(1+\rho 3+\rho 2\,\rho 3)/(1+\rho 3)$. By assigning the concrete numerical values to this formula, reduction gear ratio i4 of the forward fourth-speed is calculated as i4=1.197. The inverse of reduction gear ratio i4 is equal to 0.835.

A reduction gear ratio i5 of the fifth-speed in the forward running is expressed by a formula: $i5=1.0$. Without assigning the concrete numerical values to this formula, reduction gear ratio i5 of the forward fifth-speed is equal to 1.000. The inverse of reduction gear ratio i5 is equal to 1.000.

A reduction gear ratio i6 of the sixth-speed in the forward running is expressed by a formula: $i6=(1+\rho1)/(1+\rho1+\rho3)$. By assigning the concrete numerical values to this formula, reduction gear ratio i6 of the forward sixth-speed is calculated as $i6=0.705$. The inverse of reduction gear ratio i6 is equal to 1.418.

A reduction gear ratio i7 of the seventh-speed in the forward running is expressed by a formula: $i7=1/(1+\rho3)$. By assigning the concrete numerical values to this formula, reduction gear ratio i7 of the forward seventh-speed is calculated as $i7=0.606$. The inverse of reduction gear ratio i7 is equal to 1.650.

A reduction gear ratio iR of the reverse-speed is expressed by a formula: $iR=-\rho1/(\rho3-\rho1)$. By assigning the concrete numerical values to this formula, reduction gear ratio iR of the reverse-speed is calculated as $iR=-5.500$. The inverse of reduction gear ratio iR is equal to −0.182.

Figures 8, 9:
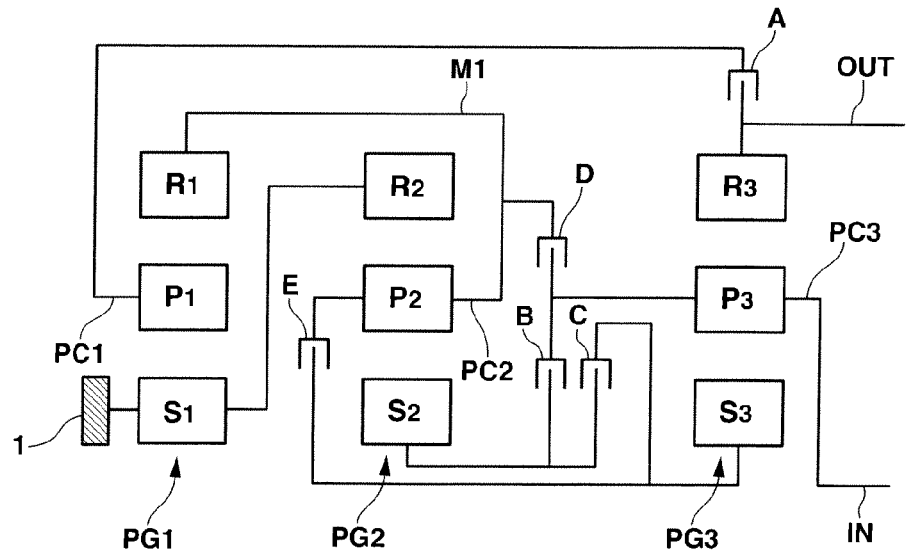
FIG. 8 is a view showing differences between respective first to seventh speeds according to the second embodiment.
FIG. 9 is a skeleton diagram showing an automatic transmission according to a first modified example of the second embodiment.

Next, a characteristic of the respective reduction gear ratios in the second embodiment is explained referring to FIG. 8. FIG. 8 is a table showing interrelations among the respective speed-ratios obtained by the automatic transmission in the second embodiment. It is proper that a ratio between speed-ratios (i.e., relations among respective speed-ratios) is evaluated based on how close the V1000 is to arithmetic series (arithmetic progression). This V1000 is comparable to a vehicle-speed range which each speed-ratio is in charge of (a vehicle-speed range which each speed-ratio covers). That is, in the case where the V1000 is allocated in a manner of arithmetic series, each of the in-charge vehicle-speed ranges in respective speed-ratios has an equivalent width to one another. In this case, particularly; upshifts can become rhythmical, and a selection of speed-ratio is conducted with no difficulty on a downhill or uphill road, so that the automatic transmission having a superior drivability can be achieved.

In order to quantitatively determine how the V1000 has deviated or departed from the arithmetic series, the following procedure is used. That is, the inverses of reduction gear ratio values under the respective speed-ratios are normalized by regarding the inverse of reduction gear ratio value under the highest-step speed-ratio (seventh-speed) as a value equal to 1, and then a deviation degree (amount) of these normalized values from the arithmetic series is quantitatively calculated. In the automatic transmission according to the second embodiment, the standard deviation calculated is equal to 0.052 which is recognized as an extremely small value.

Effects According to the Second Embodiment

①CD Effects by Virtue of Structural Skeleton as a Whole

In the second embodiment, the automatic transmission capable of attaining the seven speeds of forward running and the one speed of reverse running can be realized with proper reduction gear ratios being ensured; although the automatic transmission is constructed by a limited number of simple constructional elements, namely, the three sets of simple (single) planet gears (three single-pinion-type planetary gear sets) and the five friction elements.

② Effects by Virtue of the Usage of Three Simple Planetary Gear Sets

Because of the usage of the three sets of simple planet gears (the usage of three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, the gear durability can be enhanced.

③ Effects Based on Gear Ratio

All of the gear ratios $\rho1$, $\rho2$ and $\rho3$ in the respective planetary gear sets are close to a center value 0.5. Accordingly, a possible range which is obtained by freely setting the three gear ratios is wide so that a degree of freedom in reduction gear ratio can become higher.

④ Effects Based on Ratio Coverage in the Forward Running

A ratio coverage (gear-ratio width) of the forward running is defined by dividing the reduction gear ratio of the lowest-speed (step) by the reduction gear ratio of the highest-speed (step), i.e., the reduction gear ratio of the lowest-speed/the reduction gear ratio of the highest-speed. It can be described that a compatibility between an accelerating performance at the time of vehicle start and a fuel economy at the time of high speed cruise of vehicle becomes better, and also a degree of freedom to set the gear ratio in respective forward speed-ratios becomes higher; as the value of ratio coverage becomes greater. As concrete numerical values in the second embodiment, the reduction gear ratio of the forward first-speed is equal to 4.227 and the reduction gear ratio of the forward seventh-speed is equal to 0.606. In this embodiment, the ratio coverage from first-speed to seventh-speed is equal to 6.98, and hence a sufficient ratio coverage can be ensured. Therefore, for example, the automatic transmission according to the second embodiment is useful also as a transmission for a vehicle equipped with a diesel engine as its power source, although a width of rotational speed (number of revolutions) of diesel engine is narrower than that of a gasoline engine and a torque of diesel engine is higher than that of a gasoline engine having the same engine displacement.

Moreover, in the case where the gear ratio of the low-speed side is great relative to the ratio coverage, a torque transmitted to the final gear becomes relatively great. Hence, this case requires a sufficient strength of the automatic transmission or propeller shaft, so that the whole of vehicle body is upsized. That is, it is preferable that the gear ratio (value of speed ratio) of the lowest-speed is not so great under the same condition of ratio coverage. In an automatic transmission shown by FIG. 23 in the document of U.S. Pat. No. 6,648,791, a gear ratio of the highest-speed (highest step for shift) is equal to 1. Hence in this technique, when trying to enlarge the ratio coverage, a gear ratio (value) of the lowest-speed (lowest step for shift) needs to be enlarged, so that the upsizing of the automatic transmission and the propeller shaft is caused. On the other hand, in the automatic transmission according to the second embodiment of the present invention, a sufficient ratio coverage can be ensured without the necessity of enlarging the gear ratio of the lowest-speed so much.

⑤ Effects Based on 1-R Ratio

A value of 1-R ratio (Reverse-speed/First-speed) is a value near 1, concretely, equal to 1.30. Accordingly, an acceleration feel of vehicle relative to a depressing adjustment of an accelerator pedal does not greatly vary between at the time of forward running and at the time of reverse running. Therefore, the problem that the drivability is worsened can be avoided.

⑥ Effects Based on Standard Deviation Related to the V1000

Since the standard deviation can be made an extremely small value (for example, 0.052 in this embodiment), the widths of the vehicle-speed ranges in the respective speed-ratios (the respective steps for shift) are equivalent to one another. Accordingly, particularly, the upshift attains a rhythmical shift, and the selection of reduction gear ratio is conducted with no difficulty on a downhill or uphill road, so that the automatic transmission having a superior drivability can be provided.

⑦ Effects Based on the Number of Changeovers Among the Friction Elements at the Time of Shift (i) If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and the other one friction element is engaged at the time of shift. That is, it is favorable that a so-called double-changeover is avoided. In the second embodiment, the shifts among the forward first-speed to the forward fourth-speed are performed under the condition where first friction element A is maintained in engaged state. Moreover, the shifts among the forward fourth-speed to the forward seventh-speed are performed under the condition where fifth friction element E is maintained in engaged state. Namely, each shift between adjacent two speed-ratios (gear steps) among the forward first- to seventh-speeds can be achieved by releasing one friction element and by engaging one friction element. Accordingly, each of all the shifts between adjacent two speed-ratios of forward running is performed by means of only the changeover from one friction element to the other one friction element. Therefore, the control during the shift can be prevented from being complicated.

(ii) As mentioned in the above (i), all the shifts between adjacent two speed-ratios can be achieved by the changeover shift which releases one friction element and engages one friction element. Moreover, similarly, each one-ratio-skip shift (e.g., forward first-speed→forward third-speed) among the forward first- to seventh-speeds can also be achieved by releasing one friction element and by engaging the other one friction element. Accordingly, a controllability thereof can be enhanced.

⑧ Effects Based on Layout (i) In the automatic transmission according to the second embodiment, on a radially outer side of the three planetary gear sets, connecting members are disposed so as not to become in a three-layered form, as shown in the skeleton diagram of FIG. 6. Accordingly, the automatic transmission becomes resistant to the occurrence of the retention of lubricating oil (disrupted flow of lubricating oil), so that the fuel economy can be improved by reducing the frictions.

(ii) Moreover, the rotating member passing on the outer peripheral side of the planetary gear sets is formed in a single-layered structure, as shown by the skeleton diagram of FIG. 6. Generally in the automatic transmission, lubricating oil is always supplied to respective rotating elements such as gears and bearings (not shown) for the purpose of cooling, lubrication and the like. This lubricating oil is generally supplied from a shaft-center side of the transmission by means of centrifugal force. At this time, if an efficiency of discharge of lubricating oil becomes worsened on the outer peripheral side of the planetary gear sets, oil temperature rises so that a durability of friction elements, bearings and the like is reduced. Since the rotating member passing on the outer peripheral side of the planetary gear sets forms the single-layered structure in the second embodiment as mentioned above, the discharging efficiency of lubricating oil is not worsened so that the temperature rise is suppressed to improve the durability.

First Modified Example

Next, a first modified example of the second embodiment according to the present invention will now be explained. Since a basic structure of the first modified example is the same as that of the pre-modified example of the second embodiment explained above, only structural parts of the first modified example which are different from the above pre-modified example are now explained. In the above pre-modified example of the second embodiment; the three single-pinion-type planetary gear sets, third planetary gear set PG3, second planetary gear set PG2 and first planetary gear set PG1 as the gear train are disposed in this order (third planetary gear set PG3→second planetary gear set PG2→first planetary gear set PG1) from a side of planetary gear set connected with input shaft IN and output shaft OUT. Contrary to this, in the first modified example, the three planetary gear sets are disposed in order as third planetary gear set PG3→first planetary gear set PG1→second planetary gear set PG2 from the side of planetary gear set connected with input shaft IN and output shaft OUT. FIG. 9 gives respective reference signs to the three planetary gear sets in the order as first planetary gear set PG1→second planetary gear set PG2→third planetary gear set PG3 from the left side of FIG. 9. However, in a correspondence relation with the pre-modified example of the second embodiment; first planetary gear set PG1 of the first modified example corresponds to second planetary gear set PG2 of the pre-modified example, second planetary gear set PG2 of the first modified example corresponds to first planetary gear set PG1 of the pre-modified example, and third planetary gear set PG3 of the first modified example corresponds to third planetary gear set PG3 of the pre-modified example.

All of the positional relations of respective friction elements, the connecting relations of respective rotating members, and the engagement relations of friction elements under the respective speed-ratios are the same as those in the pre-modified example.

In this modified example, the three planetary gear sets are arranged in such a manner that first planetary gear set PG1 (which corresponds to second planetary gear set PG2 of the pre-modified example of the second embodiment) is disposed at an end portion of the three planetary gear sets, and thereby first ring gear R1 (which corresponds to second ring gear R2 of the pre-modified example) can be caught from its radially inner side by a first rotating member M1 connecting first ring gear R1 with second carrier PC2 (which corresponds first rotating member M1 connecting second ring gear R2 with first carrier PC1 of the pre-modified example). Accordingly, in this modified example, first rotating member M1 can be disposed on the outer peripheral side of the planetary gear sets, and thereby the rotating shaft passing through radially inner side of the sun gears can be designed in a double-shaft structure at a maximum. Therefore, dimensions of each sun gear are not restricted as compared with the technique disclosed in the document of U.S. Pat. No. 6,648,791, and a degree of freedom to design the ratio between teeth numbers in each planetary gear set is high so that a degree of freedom to design the automatic transmission can be enhanced.

Third Embodiment

Figure 10:
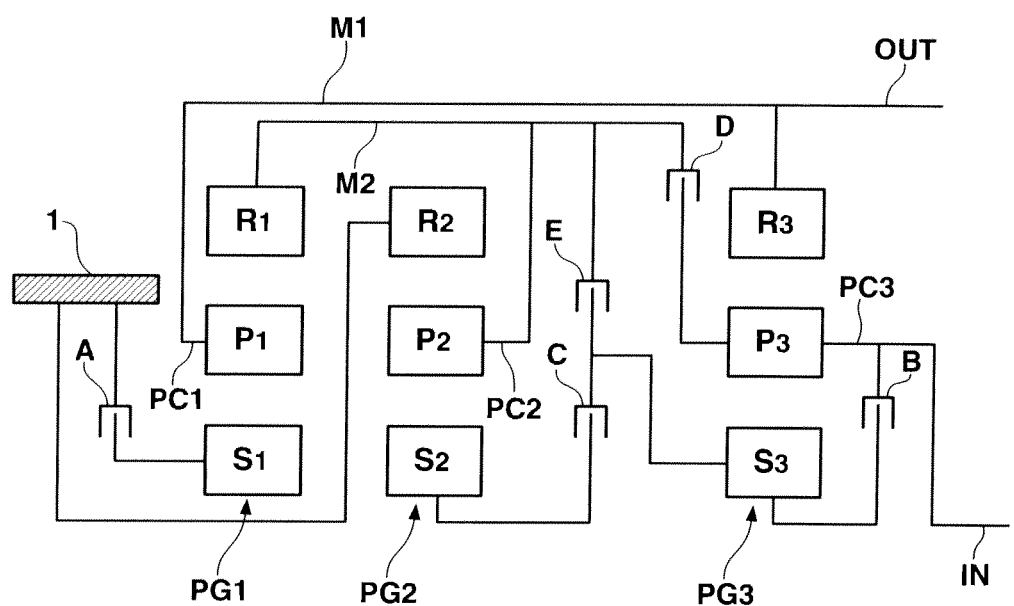
FIG. 10 is a skeleton diagram showing an automatic transmission according to a third embodiment of the present invention.

At first, structures according to a third embodiment of the present invention will now be explained. FIG. 10 is a skeleton diagram showing the shift mechanism of a step (multiple-step type) automatic transmission according to the third embodiment. FIG. 11 is a diagram showing a concrete example of a table regarding engagements of friction elements and reduction gear ratios (speed reducing ratios) in the automatic transmission according to the third embodiment.

The automatic transmission according to the third embodiment includes a first planetary gear set PG1, a second planetary gear set PG2 and a third planetary gear set PG3, as a gear train, as shown in FIG. 10. Each of the three planetary gear sets PG1, PG2 and PG3 is of single-pinion type. First planetary gear set PG1 includes a first sun gear 51, a first ring gear R1, and a first pinion P1 engaged or meshed with first sun gear S1 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3.

An input shaft IN is always connected with third carrier PC3 (i.e., constantly rotates together with third carrier PC3). Third ring gear R3 is always connected with first carrier PC1 by a first rotating member M1. An output shaft OUT is always connected with first rotating member M1, namely forms first rotating member M1. First ring gear R1 is always connected with second carrier PC2 to form a second rotating member M2. Second ring gear R2 is always locked relative to a transmission case 1 (i.e., constantly fastened to the transmission case 1).

The automatic transmission further includes one brake, i.e., a first friction element A; and four clutches, i.e., second to fifth friction elements B, C, D and E. The first friction element A is provided between first sun gear 51 and transmission case 1, and is adapted to selectively lock (stop) a rotation of first sun gear 51 relative to transmission case 1 (i.e., selectively fasten first sun gear S1 to transmission case 1). The second friction element B is provided between third sun gear S3 and third carrier PC3, and is adapted to selectively connect third sun gear S3 with third carrier PC3. The third friction element C is provided between second sun gear S2 and third sun gear S3, and is adapted to selectively connect second sun gear S2 with third sun gear S3. The fourth friction element D is provided between second rotating member M2 and third carrier PC3, and is adapted to selectively connect second rotating member M2 with third carrier PC3. The fifth friction element E is provided between second rotating member M2 and third sun gear S3, and is adapted to selectively connect second rotating member M2 with third sun gear S3. In the third embodiment, the three planetary gear sets are disposed in order as third planetary gear set PG3=second planetary gear set PG2→first planetary gear set PG1 from the side of planetary gear set connected with input shaft IN and output shaft OUT.

Output shaft OUT is provided with an output gear or the like to transmit rotational driving force through a differential gear and a drive shaft to a drive wheel, which are not shown. In the case of the third embodiment, since output shaft OUT is obstructed by a member for locking second ring gear R2, the automatic transmission is applicable to a FF vehicle.

The relations in engagements (connections) of the friction elements under respective speed-ratios (i.e., respective steps for shift) will be explained below referring to the engagement table of FIG. 11 (these engagements for respective speed-ratios are attained by a shift control section or means). In the table of FIG. 11, the sign ◯ represents the engagement, and the blank represents the disengagement.

At first, the states at the time of forward running will now be explained. A first-speed (first speed-ratio) is achieved by engaging first friction element A and second friction element B. A second-speed is achieved by engaging first friction element A and third friction element C. A third-speed is achieved by engaging first friction element A and fourth friction element D. A fourth-speed is achieved by engaging first friction element A and fifth friction element E. A fifth-speed is achieved by engaging fourth friction element D and fifth friction element E. A sixth-speed is achieved by engaging second friction element B and fifth friction element E. A seventh-speed is achieved by engaging third friction element C and fifth friction element E. Next, the state at the time of reverse running is now explained. A reverse-speed is achieved by engaging third friction element C and fourth friction element D.

Next, a concrete example of the reduction gear ratios according to the third embodiment will now be explained referring to FIG. 11. The following explanations are given in the case where a gear ratio $\rho1=ZS1/ZR1$ of first planetary gear set PG1 is equal to 0.45 (i.e., $\rho1=ZS1/ZR1=0.45$), a gear ratio $\rho2=ZS2/ZR2$ of second planetary gear set PG2 is equal to 0.45 (i.e., $\rho2=ZS2/ZR2=0.45$), and a gear ratio $\rho3=ZS3/ZR3$ of third planetary gear set PG3 is equal to 0.55 (i.e., $\rho3=ZS3/ZR3=0.55$). Where, each of ZS1, ZS2, ZS3, ZR1, ZR2 and ZR3 represents the number of teeth of the corresponding gear.

A reduction gear ratio i1 of the first-speed in the forward running is expressed by a formula: $i1=(1+\rho1)(1+\rho2)/\rho1$. By assigning the concrete numerical values to this formula, reduction gear ratio i1 of the forward first-speed is calculated as i1=4.672. The inverse of reduction gear ratio i1 is equal to 0.214.

A reduction gear ratio i2 of the second-speed in the forward running is expressed by a formula: $i2=(\rho2+\rho3(1+\rho1)(1+\rho2))/(\rho2(1+\rho3))$. By assigning the concrete numerical values to this formula, reduction gear ratio i2 of the forward second-speed is calculated as i2=2.303. The inverse of reduction gear ratio i2 is equal to 0.434.

A reduction gear ratio i3 of the third-speed in the forward running is expressed by a formula: $i3=1+\rho1$. By assigning the concrete numerical values to this formula, reduction gear ratio i3 of the forward third-speed is calculated as i3=1.450. The inverse of reduction gear ratio i3 is equal to 0.690.

A reduction gear ratio i4 of the fourth-speed in the forward running is expressed by a formula: $i4=(1+\rho3+\rho1\rho3)/(1+\rho3)$. By assigning the concrete numerical values to this formula, reduction gear ratio i4 of the forward fourth-speed is calculated as i4=1.160. The inverse of reduction gear ratio i4 is equal to 0.862.

A reduction gear ratio i5 of the fifth-speed in the forward running is expressed by a formula: i5=1.0. Without assigning the concrete numerical values to this formula, reduction gear ratio i5 of the forward fifth-speed is equal to 1.000. The inverse of reduction gear ratio i5 is equal to 1.000.

A reduction gear ratio i6 of the sixth-speed in the forward running is expressed by a formula: i6=(1+ρ2)/(1+ρ2+ρ3). By assigning the concrete numerical values to this formula, reduction gear ratio i6 of the forward sixth-speed is calculated as i6=0.725. The inverse of reduction gear ratio i6 is equal to 1.379.

A reduction gear ratio i7 of the seventh-speed in the forward running is expressed by a formula: i7=1/(1+ρ3). By assigning the concrete numerical values to this formula, reduction gear ratio i7 of the forward seventh-speed is calculated as i7=0.645. The inverse of reduction gear ratio i7 is equal to 1.550.

A reduction gear ratio iR of the reverse-speed is expressed by a formula: iR=ρ2/(ρ2−ρ3). By assigning the concrete numerical values to this formula, reduction gear ratio iR of the reverse-speed is calculated as iR=−4.500. The inverse of reduction gear ratio iR is equal to −0.222.

Figures 12, 13:
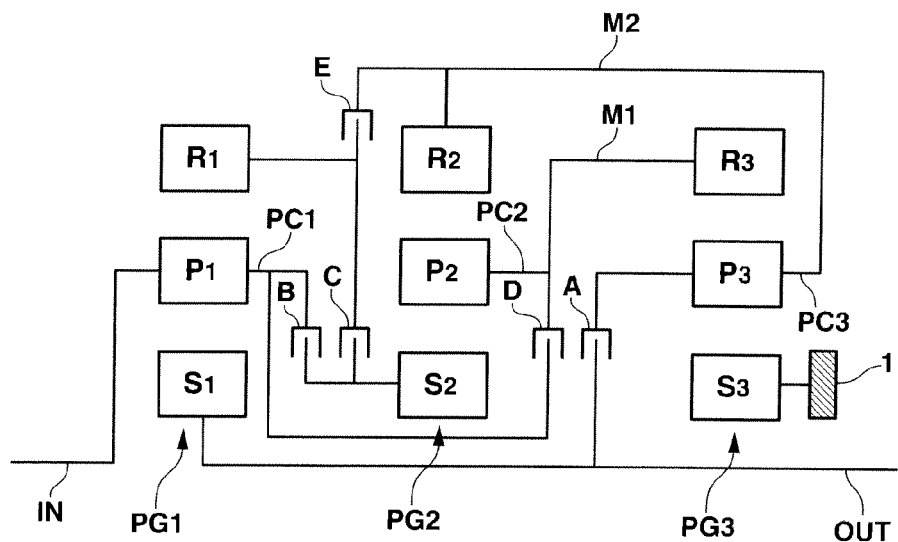
FIG. 12 is a view showing differences between respective first to seventh speeds according to the third embodiment.
FIG. 13 is a skeleton diagram showing an automatic transmission according to a fourth embodiment of the present invention.

Next, a characteristic of the respective reduction gear ratios in the third embodiment is explained referring to FIG. 12. FIG. 12 is a table showing interrelations among the respective speed-ratios obtained by the automatic transmission in the third embodiment. It is proper that a ratio between speed-ratios (i.e., relations among respective speed-ratios) is evaluated based on how close the V1000 is to arithmetic series. This V1000 is comparable to a vehicle-speed range which each speed-ratio is in charge of (i.e., a vehicle-speed range which each step for shift covers). That is, in the case where the V1000 is allocated in a manner of arithmetic series, each of the in-charge vehicle-speed ranges in respective speed-ratios has an equivalent width to one another. In this case, particularly; upshifts can become rhythmical, and a selection of speed-ratio is conducted with no difficulty on a downhill or uphill road, so that the automatic transmission having a superior drivability can be achieved.

In order to quantitatively determine how the V1000 has deviated or departed from the arithmetic series, the following procedure is used. That is, the inverses of reduction gear ratio values under the respective speed-ratios are normalized by regarding the inverse of reduction gear ratio value under the highest-step speed-ratio (seventh-speed) as a value equal to 1, and then a deviation degree (amount) of these normalized values from the arithmetic series is quantitatively calculated. In the automatic transmission according to the third embodiment, the standard deviation calculated is equal to 0.051 which is recognized as an extremely small value.

Effects according to the Third Embodiment

① Effects by Virtue of Structural Skeleton as a Whole

In the third embodiment, the automatic transmission capable of attaining the seven speeds of forward running and the one speed of reverse running can be realized with proper reduction gear ratios being ensured; although the automatic transmission is constructed by a limited number of simple constructional elements, namely, the three sets of simple (single) planet gears (three single-pinion-type planetary gear sets) and the five friction elements.

② Effects by Virtue of the Usage of Three Simple Planetary Gear Sets

Because of the usage of the three sets of simple planet gears (the usage of three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, the gear durability can be enhanced.

③ Effects Based on Gear Ratio

All of the gear ratios ρ1, ρ2 and ρ3 in the respective planetary gear sets are close to a center value 0.5. Accordingly, a possible range which is obtained by freely setting the three gear ratios is wide so that a degree of freedom in reduction gear ratio can become higher.

④ Effects Based on a Ratio Coverage in the Forward Running

A ratio coverage (gear-ratio width) of the forward running is defined by dividing the reduction gear ratio of the lowest-speed (step) by the reduction gear ratio of the highest-speed, i.e., the reduction gear ratio of the lowest-speed/the reduction gear ratio of the highest-speed. A compatibility between an accelerating performance at the time of vehicle start and a fuel economy at the time of high speed cruise of vehicle becomes better, and also a degree of freedom to set the gear ratio value in each forward speed-ratio becomes higher; as the value of ratio coverage becomes greater. As concrete numerical values in the third embodiment, the reduction gear ratio of the forward first-speed is equal to 4.672 and the reduction gear ratio of the forward seventh-speed is equal to 0.645. In this embodiment, the ratio coverage from first-speed to seventh-speed is equal to 7.24, and hence a sufficient ratio coverage can be ensured. Therefore, for example, the automatic transmission according to the third embodiment is useful also as a transmission for a vehicle equipped with a diesel engine as its power source, although a width of rotational speed (number of revolutions) of diesel engine is narrower than that of a gasoline engine and a torque of diesel engine is higher than that of a gasoline engine having the same engine displacement.

Moreover, in the case where the gear ratio value of the low-speed side is great relative to the ratio coverage, a torque transmitted to a final gear becomes relatively great. Hence, this case requires a sufficient strength of the automatic transmission or propeller shaft, so that the whole of vehicle body is upsized. That is, it is preferable that the gear ratio value (value of speed ratio) of the lowest-speed is not so great under the same condition of ratio coverage. In an automatic transmission shown by FIG. 23 in the document of U.S. Pat. No. 6,648,791, a gear ratio of the highest-speed (highest step for shift) is equal to 1. Hence in this technique, when trying to enlarge the ratio coverage, a gear ratio (value) of the lowest-speed (lowest step for shift) needs to be enlarged, so that the upsizing of the automatic transmission and the propeller shaft is caused. On the other hand, in the automatic transmission according to the third embodiment of the present invention, a sufficient ratio coverage can be ensured without the necessity of enlarging the gear ratio of the lowest-speed so much.

⑤ Effects Based on 1-R Ratio

A value of 1-R ratio (Reverse-speed/First-speed) is a value near 1, concretely, equal to 0.963. Accordingly, an acceleration feel of vehicle relative to a depressing adjustment of an accelerator pedal does not greatly vary between at the time of forward running and at the time of reverse running. Therefore, the problem that the drivability is worsened can be avoided.

⑥ Effects Based on Standard Deviation Related to the V1000

Since the standard deviation can be made an extremely small value (concretely, 0.051 in this embodiment), the widths of the vehicle-speed ranges in the respective speed-ratios (the respective steps for shift) are equivalent to one another. Accordingly, particularly, the upshifts is rhythmical, and the selection of reduction gear ratio is carried out with no difficulty on a downhill or uphill road, so that the automatic transmission having a superior drivability can be provided.

⑦ Effects Based on the Number of Changeovers Among the Friction Elements at the Time of Shift (i) If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and another friction element is engaged at the time of shift. That is, it is favorable that a so-called double-changeover is avoided. In the third embodiment, the shifts among the forward first-speed to the forward fourth-speed are performed under the condition where first friction element A is maintained in engaged state. Moreover, the shifts among the forward fourth-speed to the forward seventh-speed are performed under the condition where fifth friction element E is maintained in engaged state. Namely, each shift between adjacent two speed-ratios among the forward first- to seventh-speeds can be achieved by releasing one friction element and by engaging one friction element. Accordingly, each of all the shifts between adjacent two speed-ratios of forward running is performed by means of only the changeover from one friction element to the other one friction element. Therefore, the control during the shift can be prevented from being complicated.

(ii) As mentioned in the above (i), all the shifts between adjacent two speed-ratios can be achieved by the changeover shift which releases one friction element and engages one friction element. Moreover, similarly, each one-ratio-skip shift (e.g., forward first-speed→forward third-speed) among the forward first- to seventh-speeds can also be achieved by releasing one friction element and by engaging the other one friction element. Accordingly, a controllability thereof can be enhanced.

⑧ Effects Based on Layout (i) In the automatic transmission according to the third embodiment, on a radially outer side of the three planetary gear sets, connecting members are disposed so as not to become in a three-layered form, as shown in the skeleton diagram of FIG. 10. Accordingly, it is suppressed that the retention of a lubricating oil (disrupted flow of lubricating oil) is caused, so that the fuel economy can be improved by reducing the friction.

(ii) A member passing on a radially inner side of the three planetary gear sets is disposed in a single-shaft structure. Accordingly, dimensions of each sun gear are not restricted as compared with the technique disclosed in the document of U.S. Pat. No. 6,648,791, and a degree of freedom to design the ratio between teeth numbers in each planetary gear set is high so that a degree of freedom to design the automatic transmission can be enhanced.

⑨ Effects from a Viewpoint of the Number of Friction Elements

In the third embodiment, first friction element A is provided as a brake. That is, since the five friction elements include the brake, the increase of the number of sealings for rotation and the increase of centrifugal canceling mechanisms can be suppressed as compared with the case where the number of clutches is large. Thereby, the increase of the number of components and the increase of axial length can be suppressed while enhancing the fuel economy.

Fourth Embodiment

At first, structures according to a fourth embodiment of the present invention will now be explained. FIG. 13 is a skeleton diagram showing the shift mechanism of a step (multiple-step type) automatic transmission according to the fourth embodiment. FIG. 13 is a diagram showing a concrete example of a table regarding engagements of friction elements and reduction gear ratios (speed reducing ratios) in the automatic transmission according to the fourth embodiment.

The automatic transmission according to the fourth embodiment includes a first planetary gear set PG1, a second planetary gear set PG2 and a third planetary gear set PG3, as a gear train, as shown in FIG. 13. Each of the three planetary gear sets PG1, PG2 and PG3 is of single-pinion type. First planetary gear set PG1 includes a first sun gear S1, a first ring gear R1, and a first pinion P1 engaged or meshed with first sun gear 51 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3.

An input shaft IN is always connected (or engaged) with first carrier PC1 (i.e., constantly rotates together with first carrier PC1). Third ring gear R3 is always connected with second carrier PC2 to form a first rotating member M1. Second ring gear R2 is always connected with third carrier PC3 to form a second rotating member M2. An output shaft OUT is always connected with first sun gear S1. Third sun gear S3 is always locked relative to a transmission case 1 (i.e., constantly fastened to transmission case 1).

The automatic transmission further includes five clutches, i.e., first to fifth friction elements A, B, C, D and E. The first friction element A is provided between third carrier PC3 and first sun gear S1, and is adapted to selectively connect (engage) third carrier PC3 with first sun gear S1. The second friction element B is provided between first carrier PC1 and second sun gear S2, and is adapted to selectively connect first carrier PC1 with second sun gear S2. The third friction element C is provided between first ring gear R1 and second sun gear S2, and is adapted to selectively connect first ring gear R1 with second sun gear S2. The fourth friction element D is provided between first carrier PC1 and first rotating member M1, and is adapted to selectively connect first carrier PC1 with first rotating member M1. The fifth friction element E is provided between first ring gear R1 and second rotating member M2, and is adapted to selectively connect first ring gear R1 with second rotating member M2. In the fourth embodiment, the three planetary gear sets are disposed in order as third planetary gear set PG3→second planetary gear set PG2→first planetary gear set PG1 from the side of planetary gear set connected with input shaft IN and output shaft OUT.

Output shaft OUT is provided with an output gear or the like to transmit rotational driving force through a differential gear and a drive shaft to a drive wheel, which are not shown. In the case of the fourth embodiment, since output shaft OUT is not obstructed by the other member or the like, the automatic transmission is applicable to both of the FF vehicle and FR vehicle.

The relations in engagements of the friction elements under respective speed-ratios (i.e., respective steps for shift) will be explained below referring to the engagement table of FIG. 14 (these engagements for respective speed-ratios are attained by a shift control section or means). In the table of FIG. 14, the sign ○ represents the engagement, and the blank represents the disengagement.

At first, the states at the time of forward running will now be explained. A first-speed (first speed-ratio) is achieved by engaging first friction element A and second friction element B. A second-speed is achieved by engaging first friction element A and third friction element C. A third-speed is achieved by engaging first friction element A and fourth friction element D. A fourth-speed is achieved by engaging first friction element A and fifth friction element E. A fifth-speed is achieved by engaging fourth friction element D and fifth friction element E. A sixth-speed is achieved by engaging second friction element B and fifth friction element E. A seventh-speed is achieved by engaging third friction element C and fifth friction element E. Next, the state at the time of reverse running is now explained. A reverse-speed is achieved by engaging third friction element C and fourth friction element D.

Next, a concrete example of the reduction gear ratios according to the fourth embodiment will now be explained referring to FIG. 14. The following explanations are given in the case where a gear ratio $\rho1=ZS1/ZR1$ of first planetary gear set PG1 is equal to 0.60 (i.e., $\rho1=ZS1/ZR1=0.60$), a gear ratio $\rho2=ZS2/ZR2$ of second planetary gear set PG2 is equal to 0.40 (i.e., $\rho2=ZS2/ZR2=0.40$), and a gear ratio $\rho3=ZS3/ZR3$ of third planetary gear set PG3 is equal to 0.50 (i.e., $\rho3=ZS3/ZR3=0.50$). Where, each of ZS1, ZS2, ZS3, ZR1, ZR2 and ZR3 represents the number of teeth of the corresponding gear.

A reduction gear ratio i1 of the first-speed in the forward running is expressed by a formula: $i1=1+\rho3+\rho3/\rho2$. By assigning the concrete numerical values to this formula, reduction gear ratio i1 of the forward first-speed is calculated as i1=2.750. The inverse of reduction gear ratio i1 is equal to 0.371.

A reduction gear ratio i2 of the second-speed in the forward running is expressed by a formula: $i2=1+\rho3(1+\rho2)/(\rho2(1+\rho1))$. By assigning the concrete numerical values to this formula, reduction gear ratio i2 of the forward second-speed is calculated as i2=2.094. The inverse of reduction gear ratio i2 is equal to 0.478.

A reduction gear ratio i3 of the third-speed in the forward running is expressed by a formula: $i3=1+\rho3$. By assigning the concrete numerical values to this formula, reduction gear ratio i3 of the forward third-speed is calculated as i3=1.500. The inverse of reduction gear ratio i3 is equal to 0.667.

A reduction gear ratio i4 of the fourth-speed in the forward running is expressed by a formula: $i4=1.0$. Without assigning the concrete numerical values to this formula, reduction gear ratio i4 of the forward fourth-speed is equal to 1.000. The inverse of reduction gear ratio i4 is equal to 1.000.

A reduction gear ratio i5 of the fifth-speed in the forward running is expressed by a formula: $i5=\rho1(1+\rho3)/(\rho1+\rho3+\rho1\rho3)$. By assigning the concrete numerical values to this formula, reduction gear ratio i5 of the forward fifth-speed is calculated as i5=0.643. The inverse of reduction gear ratio i5 is equal to 1.555.

A reduction gear ratio i6 of the sixth-speed in the forward running is expressed by a formula: $i6=\rho1(\rho2+\rho3+\rho2\rho3)/(\rho1\rho2+\rho3(1+\rho1)(1+\rho2))$. By assigning the concrete numerical values to this formula, reduction gear ratio i6 of the forward sixth-speed is calculated as i6=0.485. The inverse of reduction gear ratio i6 is equal to 2.062.

A reduction gear ratio i7 of the seventh-speed in the forward running is expressed by a formula: $i7=\rho1/(1+\rho1)$. By assigning the concrete numerical values to this formula, reduction gear ratio i7 of the forward seventh-speed is calculated as i7=0.375. The inverse of reduction gear ratio i7 is equal to 2.667.

A reduction gear ratio iR of the reverse-speed is expressed by a formula: $iR=\rho1\rho2(1+\rho3)/(\rho1\rho2+\rho1\rho2\rho3-\rho3)$. By assigning the concrete numerical values to this formula, reduction gear ratio iR of the reverse-speed is calculated as iR=−2.571. The inverse of reduction gear ratio iR is equal to −0.389.

Effects According to the Fourth Embodiment

① Effects by Virtue of Structural Skeleton as a Whole

In the fourth embodiment, the automatic transmission capable of attaining the seven speeds of forward running and the one speed of reverse running can be obtained with proper reduction gear ratios being ensured; although the automatic transmission is constructed by a limited number of simple constructional elements, namely, the three sets of simple planet gears (three single-pinion-type planetary gear sets) and the five friction elements.

② Effects by Virtue of the Usage of Three Simple Planetary Gear Sets

Because of the usage of the three sets of simple planet gears (the usage of three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, a gear durability can be enhanced.

③ Effects Based on Gear Ratios

All of the gear ratios $\rho1$, $\rho2$ and $\rho3$ in the respective planetary gear sets are close to a center value 0.5. Accordingly, a possible range which is obtained by freely setting the three gear ratios is wide so that a degree of freedom in reduction gear ratio can become higher.

④ Effects Based on a Ratio Coverage in the Forward Running

A ratio coverage (gear-ratio width) of the forward running is defined by dividing the reduction gear ratio of the lowest-speed (step) by the reduction gear ratio of the highest-speed, i.e., the reduction gear ratio of the lowest-speed/the reduction gear ratio of the highest-speed. A compatibility between an accelerating performance at the time of vehicle start and a fuel economy at the time of high speed cruise of vehicle becomes better, and also a degree of freedom to set the gear ratio value in respective forward speed-ratios becomes higher; as the value of ratio coverage becomes greater. As concrete numerical values in the fourth embodiment, the reduction gear ratio of the forward first-speed is equal to 2.750 and the reduction gear ratio of the forward seventh-speed is equal to 0.375. In this embodiment, the ratio coverage from first-speed to seventh-speed is equal to 7.33, and hence a sufficient ratio coverage can be ensured. Therefore, for example, the automatic transmission according to the fourth embodiment is useful also as a transmission for a vehicle equipped with a diesel engine as its power source, although a width of rotational speed (number of revolutions) of diesel engine is narrower than that of a gasoline engine and a torque of diesel engine is higher than that of a gasoline engine having the same engine displacement.

Moreover, in the case where the gear ratio value of the low-speed side is great relative to the ratio coverage, a torque transmitted to a final gear becomes relatively great. Hence, this case requires a sufficient strength of the automatic transmission or propeller shaft, so that the whole of vehicle body is upsized. That is, it is preferable that the gear ratio value (value of speed ratio) of the lowest-speed is not so great under the same condition of ratio coverage. In an automatic transmission shown by FIG. 23 in the document of U.S. Pat. No. 6,648,791, a gear ratio of the highest-speed (highest step for shift) is equal to 1. Hence in this technique, when trying to enlarge the ratio coverage, a gear ratio (value) of the lowest-speed needs to be enlarged, so that the upsizing of the automatic transmission and the propeller shaft is caused. On the other hand, in the automatic transmission according to the fourth embodiment of the present invention, a sufficient ratio coverage can be ensured without the necessity of enlarging the gear ratio of the lowest-speed so much.

⑤ Effects Based on 1-R Ratio

A value of 1-R ratio (Reverse-speed/First-speed) is a value near 1, concretely, equal to 0.935. Accordingly, an acceleration feel of vehicle relative to a depressing adjustment of an accelerator pedal does not greatly vary between the forward running and the reverse running. Therefore, the problem that the drivability worsens can be avoided.

⑥ Effects Based on the Number of Changeovers Among the Friction Elements at the Time of Shift (i) If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and one friction element is engaged at the time of shift. That is, it is favorable that a so-called double-changeover is avoided. In the fourth embodiment, the shifts among the forward first-speed to the forward fourth-speed are performed under the condition where first friction element A is maintained in engaged state. Moreover, the shifts among the forward fourth-speed to the forward seventh-speed are performed under the condition where fifth friction element E is maintained in engaged state.

Namely, each shift between adjacent two speed-ratios (gear steps) among the forward first-speed to seventh-speed can be achieved by releasing one friction element and by engaging one friction element. Accordingly, each of all the shifts between adjacent two speed-ratios of forward running is performed by means of only the changeover from one friction element to the other one friction element. Therefore, the control during the shift can be prevented from being complicated.

(ii) As mentioned in the above (i), all the shifts between adjacent two speed-ratios can be achieved by the changeover shift which releases one friction element and engages one friction element. Moreover, similarly, each one-ratio-skip shift (e.g., first-speed→third-speed) among the forward first- to seventh-speeds can also be achieved by releasing one friction element and by engaging the other one friction element. Accordingly, a controllability thereof can be enhanced.

⑦ Effects Based on Layout (i) In the automatic transmission according to the fourth embodiment, on a radially outer side of the three planetary gear sets, connecting members are disposed so as not to become in a three-layered form, as shown in the skeleton diagram of FIG. 13. Accordingly, it is difficult to cause the retention of a lubricating oil (disrupted flow of lubricating oil), so that the fuel economy can be improved by reducing the frictions.

(ii) Moreover, the rotating member passing on the outer peripheral side of the planetary gear sets is formed in a single-layered structure, as shown by the skeleton diagram of FIG. 13. Generally in the automatic transmission, lubricating oil is always supplied to respective rotating elements such as gears and bearings (not shown) for the purpose of cooling, lubrication and the like. This lubricating oil is generally supplied from a shaft-center side of the transmission by means of centrifugal force. At this time, if an efficiency of discharge of lubricating oil becomes worsened on the outer peripheral side of the planetary gear sets, oil temperature rises so that a durability of friction elements, bearings and the like is reduced. Since the rotating member passing on the outer peripheral side of the planetary gear sets forms the single-layered structure in the fourth embodiment as mentioned above, the discharging efficiency of lubricating oil is not worsened so that the temperature rise is suppressed to improve the durability.

(iii) The automatic transmission according to the fourth embodiment can be designed to allow torque to be inputted to one side of the planetary gear sets and then to be outputted from another side of the planetary gear sets. Accordingly, the automatic transmission according to the fourth embodiment is applicable to both of the front drive vehicle and rear drive vehicle, namely can be widely applied.

This application is based on a prior Japanese Patent Application No. 2007-309539 filed on Nov. 29, 2007. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
a first planetary gear set including
a first sun gear,
a first pinion engaged with the first sun gear,
a first carrier supporting the first pinion, and
a first ring gear engaged with the first pinion and constantly locked;
a second planetary gear set including
a second sun gear constantly locked,
a second pinion engaged with the second sun gear,
a second carrier supporting the second pinion, and
a second ring gear engaged with the second pinion, and connected with the first carrier to define a rotating member;
a third planetary gear set including
a third sun gear,
a third pinion engaged with the third sun gear,
a third carrier supporting the third pinion, and
a third ring gear engaged with the third pinion;
an input shaft constantly connected with the third carrier;
an output shaft constantly connected with third ring gear; and
five friction elements including
a first friction element adapted to selectively connect the second carrier with the third ring gear,
a second friction element adapted to selectively connect the first sun gear with the third carrier,
a third friction element adapted to selectively connect the first sun gear with the third sun gear,
a fourth friction element adapted to selectively connect the rotating member with the third carrier, and
a fifth friction element adapted to selectively connect the rotating member with the third sun gear,
the automatic transmission being adapted to achieve at least seven forward speed-ratios and one reverse speed-ratio,
wherein each of the at least seven forward speed-ratios and the one reverse speed-ratio is achieved by an engaged state of two friction elements selected from the five friction elements,
wherein the at least seven forward speed-ratios are achieved by concurrent engagements of the first friction element and the second friction element, concurrent engagements of the first friction element and the third friction element, concurrent engagements of the first friction element and the fourth friction element, concurrent engagements of the first friction element and the fifth friction element, concurrent engagements of the fourth friction element and the fifth friction element, concurrent engagements of the second friction element and the fifth friction element, and concurrent engagements of the third friction element and the fifth friction element.

2. The automatic transmission as claimed in claim 1, wherein the one reverse speed-ratio is achieved by concurrent engagements of the third friction element and the fourth friction element.

3. The automatic transmission as claimed in claim 1, wherein each of all shifts between adjacent two speed-ratios among the at least seven forward speed-ratios is performed by releasing one friction element of the five friction elements and by engaging another one friction element of the five friction elements.

* * * * *